US012462904B2

(12) United States Patent
Mok et al.

(10) Patent No.: US 12,462,904 B2
(45) Date of Patent: Nov. 4, 2025

(54) SYSTEM AND METHOD FOR USER ACCEPTANCE TEST

(71) Applicant: JNPMEDI INC., Incheon (KR)

(72) Inventors: Min Ju Mok, Seongnam-si (KR); Young Yong Park, Incheon (KR)

(73) Assignee: JNPMEDI INC., Incheon (KR)

( * ) Notice: Subject to any disclaimer, the term of this patent is extended or adjusted under 35 U.S.C. 154(b) by 227 days.

(21) Appl. No.: 17/839,536

(22) Filed: Jun. 14, 2022

(65) Prior Publication Data

US 2023/0024700 A1   Jan. 26, 2023

(30) Foreign Application Priority Data

Jul. 20, 2021   (KR) .................. 10-2021-0095168

(51) Int. Cl.
*G16H 10/20*   (2018.01)
*G06F 3/0481*   (2022.01)
*G16H 10/60*   (2018.01)

(52) U.S. Cl.
CPC ........... *G16H 10/20* (2018.01); *G06F 3/0481* (2013.01); *G16H 10/60* (2018.01)

(58) Field of Classification Search
None
See application file for complete search history.

(56) References Cited

U.S. PATENT DOCUMENTS

| | | | |
|---|---|---|---|
| 10,204,703 B2 * | 2/2019 | Radhakrishna | G16H 70/40 |
| 2003/0208378 A1 * | 11/2003 | Thangaraj | G16H 30/40 705/2 |
| 2005/0198618 A1 * | 9/2005 | Lalonde | G06F 8/34 717/110 |
| 2009/0240548 A1 * | 9/2009 | Mullin | G06Q 10/06 705/7.27 |
| 2015/0286802 A1 * | 10/2015 | Kansara | G16H 10/20 705/3 |
| 2019/0171437 A1 * | 6/2019 | Guda | G06F 8/71 |
| 2022/0253297 A1 * | 8/2022 | Wallis | G06F 8/60 |

FOREIGN PATENT DOCUMENTS

WO   2015157235 A1   10/2015

* cited by examiner

*Primary Examiner* — John A Pauls
(74) *Attorney, Agent, or Firm* — Bridgeway IP Law Group, PLLC; Sang Ho Lee; Hyun Woo Shin (57) ABSTRACT

Provided is a user acceptance test system and a method thereof, and the user acceptance test method includes the steps of: generating a UAT file in response to a request of a user terminal; storing the UAT file and UAT file related information; generating a UAT file list page and providing the UAT file list page to the user terminal and a manager terminal; and providing the manager terminal and/or the user terminal with the UAT file, the UAT file related information, and a communication function on a detail page linked to any one among a UAT file list on the UAT file list page.

9 Claims, 4 Drawing Sheets

SYSTEM AND METHOD FOR USER ACCEPTANCE TEST

CROSS-REFERENCE TO RELATED APPLICATION(S)

The instant application claims priority to Korean patent application number 10-2021-0095168 filed on Jul. 20, 2021, the entire contents of which is hereby incorporated by reference.

BACKGROUND OF THE INVENTION

Field of the Invention

The present invention relates to a user acceptance test system and a method thereof, and proposes a system and method that provides a User Acceptance Test (UAT) for setting an electronic Case Report Form (eCRF) used to conduct clinical trials.

Background of the Related Art

As interest in health increases in modern society, the number of clinical trials conducted for development of new medicines is increasing rapidly. In the process of digitizing case report forms in conducting clinical trials, a user acceptance test process is required to confirm whether an electronic case report form is properly set in accordance with a case report form requested by the user.

The user acceptance test may be accomplished by bidirectional communication between a user and a manager. For example, the user acceptance test may be accomplished as the user generates a user acceptance test file and the manager confirms the file. In this case, a communication error, such as the difference in the viewpoints of seeing the same object, may occur between the user who generates the user acceptance test file and the manager who reads the user acceptance test file and interprets the intention.

SUMMARY OF THE INVENTION

An object of the present invention is to provide a user acceptance test system and a method thereof, in which a manager and a user in a communication relationship may see matched information.

The technical problems of the present invention are not limited to the technical problems mentioned above, and other unmentioned technical problems will be clearly understood by those skilled in the art from the following description.

To accomplish the above object, according to an aspect of the present invention, there is provided a user acceptance test method comprising the steps of: generating a user acceptance test (UAT) file in response to a request of a user terminal; storing the UAT file and UAT file related information; generating a UAT file list page and providing the UAT file list page to the user terminal and a manager terminal; and providing the manager terminal and/or the user terminal with the UAT file, the UAT file related information, and a communication function on a detail page linked to any one among a UAT file list on the UAT file list page.

The step of generating a UAT file in response to a request of a user terminal may include the step of recording a point where a UAT file generation request is generated by the user terminal.

The step of generating a UAT file in response to a request of a user terminal may further include the step of providing a UAT category list related to a reason for requesting generation of a UAT file to the user terminal, and requesting to select any one from the UAT category list.

The step of generating a UAT file in response to a request of a user terminal may further include the step of providing the user terminal with a text box UI and a capture function capable of inputting a title of and opinions about of the UAT file.

The capture function may be automatically provided to the user terminal after recording the point where the UAT file generation request is generated by the user terminal or after selecting any one from the UAT category list by the user terminal.

The UAT file related information may include at least one among a clinical trial title, manager information, user information, a title of the UAT file, and a date and time of generating the UAT file, which are related to the electronic case report form that is a target of a user acceptance test.

The UAT file list page may include the UAT file list and each UAT file related information and may be generated based on at least one among the UAT file related information.

The communication function may be a comment function including a text box UI that can be input by the manager terminal and/or the user terminal on the detail page.

To accomplish the above object, according to another aspect of the present invention, there is provided a user acceptance test system comprising: a UAT file generation unit for generating a UAT file in response to a request of a user terminal; a server management unit for providing a manager terminal and/or the user terminal with a UAT file list page and a detail page that is linked to any one among a UAT file list of the UAT file list page and includes the UAT file, UAT file related information, and a communication function; and a data storage unit for storing the UAT file and the UAT file related information.

The UAT file generation unit may record a point where a UAT file generation request is generated by the user terminal.

The UAT file generation unit may provide a UAT category list related to a reason for requesting generation of a UAT file to the user terminal, and request to select any one from the UAT category list.

The UAT file generation unit may provide the user terminal with a text box UI and a capture function capable of inputting a title of and opinions about of the UAT file.

The capture function may be automatically provided to the user terminal after recording the point where the UAT file generation request is generated by the user terminal or after selecting any one from the UAT category list by the user terminal.

The communication function may be a comment function including a text box UI that can be input by the manager terminal and/or the user terminal on the detail page.

The user acceptance test system may further comprise a notification transmission unit for transmitting a notification to the manager terminal and/or the user terminal through at least any one among a notification pop-up, an email, and a short message service (SMS).

Details of other embodiments are included in the detailed description and drawings.

DETAILED DESCRIPTION OF THE PREFERRED EMBODIMENT

Hereinafter, preferred embodiments of the present invention will be described in detail with reference to the accompanying drawings in order to clarify the technical spirit of the present invention. In describing the present invention, when it is determined that a detailed description of a related well-known function or component may unnecessarily obscure the subject matters of the present invention, the detailed description thereof will be omitted. Elements having substantially the same functional configuration among the drawings are given the same reference numbers and reference symbols as much as possible even though they are shown in different drawings. For convenience of explanation, the device and method will be described together if necessary.

Hereinafter, the term "unit" is defined herein as having its broadest definition to ordinary skill in the art to refer to software including instructions executable in a non-transitory computer-readable medium that would perform the associated function when executed, a circuit or a processor designed to perform the associated function, hardware designed to perform the associated function, or a combination of them.

Figure 1:
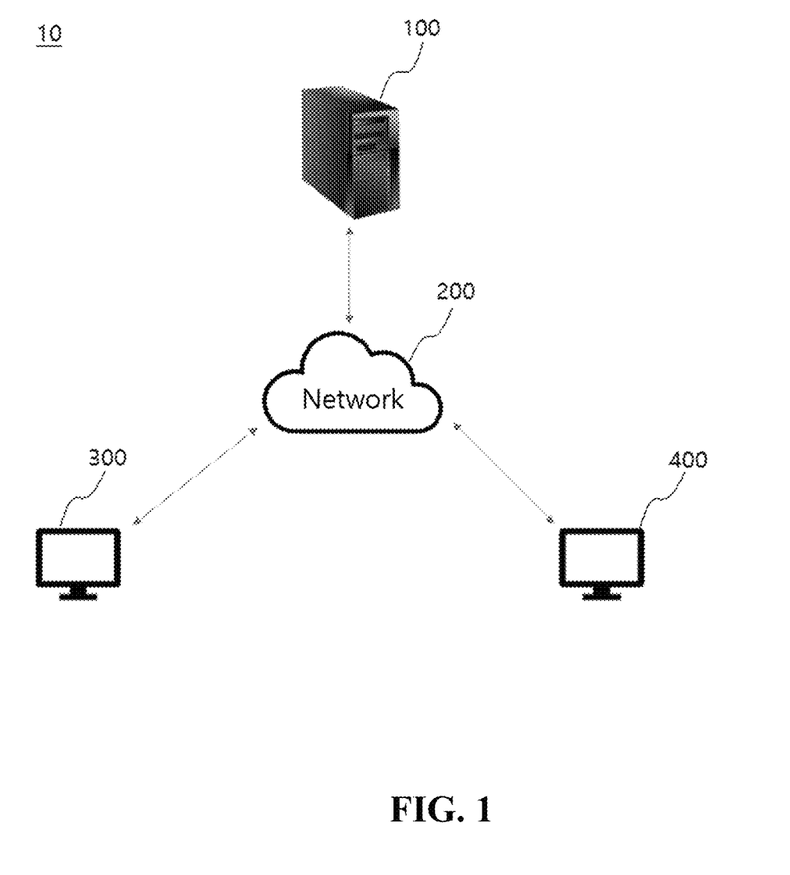
FIG. 1 is a schematic diagram showing a user acceptance test system according to an embodiment.

FIG. 1 is a schematic diagram showing a user acceptance test system according to an embodiment.

Referring to FIG. 1, a user acceptance test system 10 according to an embodiment may include a platform 100, at least one manager terminal 300, and at least one user terminal 400.

The platform 100 may provide a user acceptance test (UAT) service with regard to an electronic case report form (eCRF). Here, the user acceptance test may be a test that confirms whether the electronic case report form stored in the platform 100 meets functional and/or non-functional requirements for the sake of acceptance of the user.

Although it is described below focusing on that the platform 100 provides the user acceptance test service to one manager terminal 300 and one user terminal 400 for convenience of explanation, it is not limited thereto. For example, the platform 100 may provide the user acceptance test service to one manager terminal 300 and a plurality of user terminals 400, or provide the user acceptance test service to a plurality of manager terminals 300 and a plurality of user terminals 400. In addition, the platform 100 may provide the user acceptance test service to a plurality of manager terminals 300 and one user terminal 400.

The platform 100 is provided as a computerized system, and may provide the user acceptance test service through any one among an application program, an application, and a website.

The platform 100 may provide the stored electronic case report form to the user, and generate and store a user acceptance test file (or UAT file) in response to a request of the user. In addition, the platform 100 may provide the generated and stored user acceptance test file to the manager and the user. Accordingly, as the manager and the user perform bidirectional communication while seeing matched information through the platform 100, it may be advantageous in reducing unnecessary time and cost occurring at the user acceptance test step. A detailed description of the platform 100 will be described below with reference to FIG. 2.

The manager terminal 300 and the user terminal 400 may be a device capable of accessing the platform 100 through a wired/wireless communication network such as the Internet and/or an intranet. For example, the manager terminal 300 and the user terminal 400 may be a mobile terminal such as a laptop computer, a handheld device, a smart phone, a tablet PC or the like, a desktop computer, or a device using such a device or directly or indirectly connected thereto.

The manager using the manager terminal 300 and the user using the user terminal 400 may access at least any one among an application program, an application, and a website provided by the platform 100 through their own terminals, and may be provided with a user acceptance test from the platform 100.

The manager terminal 300 may be a terminal of any one among an institution, a corporation, a company, and an individual that generates an electronic case report form in response to a user's request for generating an electronic case report form and provides the electronic case report form to the user. Although it is described below focusing on that the manager terminal 300 is a terminal of any one among an institution, a corporation, a company, and an individual that provides the electronic case report form to the user, it is not limited thereto. For example, the manager terminal 300 may be a terminal of an institution that generates an electronic case report form in response to a request of the user or any one among an institution, a corporation, a company, and an individual that provides a user acceptance test service to the user who requests generation of the electronic case report form.

The user terminal 400 may be a terminal of any one among an institution, a corporation, a company, and an individual requesting generation of an electronic case report form.

The network 200 is a communication network through which the platform 100, the manager terminal 300, and the user terminal 400 communicate with each other, and may be configured without regard to a particular communication form. For example, although the network 200 may be configured of various communication networks such as a Personal Area Network (PAN), a Local Area Network (LAN), a Metropolitan Area Network (MAN), and a Wide Area Network (WAN), it is not limited thereto.

Figure 2:
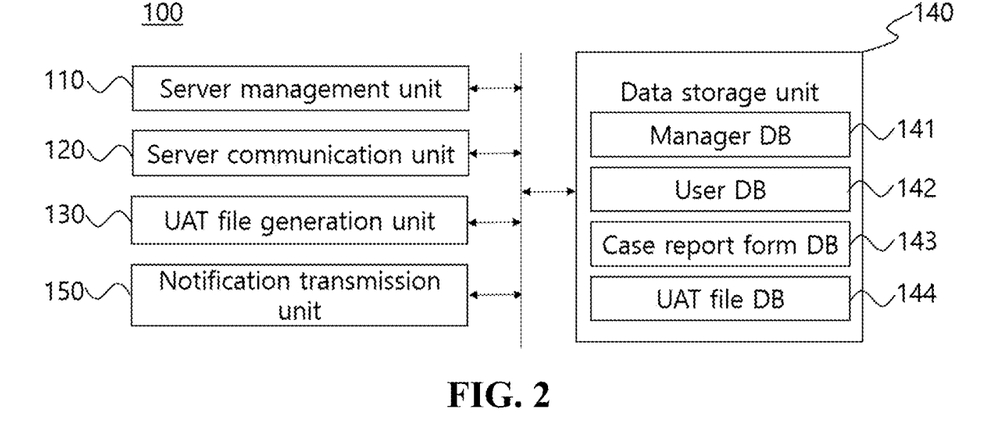
FIG. 2 is a block diagram schematically showing the configuration of a platform according to an embodiment.

FIG. 2 is a block diagram schematically showing the configuration of a platform according to an embodiment.

Referring to FIG. 2, the platform 100 may include a server management unit 110, a server communication unit 120, a UAT file generation unit 130, and a data storage unit 140. In addition, the platform 100 may further include a notification transmission unit 150.

In order to provide a user acceptance test service to the manager terminal 300 and the user terminal 400, the server management unit 110 may request personal information such as an e-mail, an ID, a password, a phone number, and the like and/or information on a company, a corporation or an organization (hereinafter, referred to as manager information or user information) and store the information in the data storage unit 140.

Figure 3:
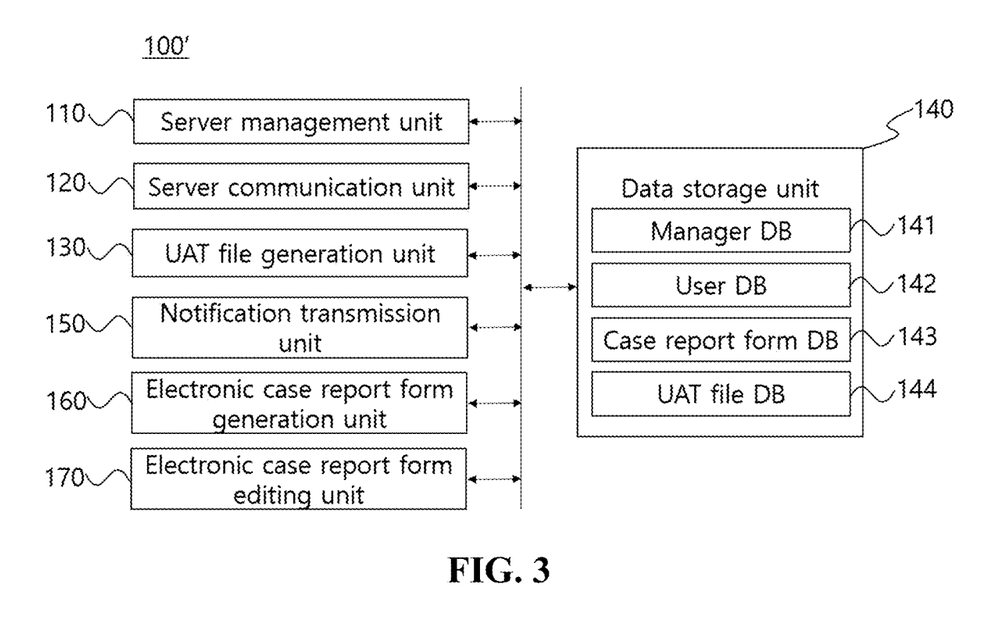
FIG. 3 is a block diagram schematically showing the configuration of a platform according to another embodiment.

The server management unit 110 may receive an electronic case report form and electronic case report form related information from the manager terminal 300, an electronic case report form generation system (not shown), the electronic case report form generation unit 160 shown in FIG. 3, or the like through the server communication unit 120, and store them in the data storage unit 140. In this specification, the electronic case report form related information may include a clinical trial title, a protocol number, manager information, user information, and the like related to a corresponding electronic case report form. When a plurality of managers uses the platform 100, the server management unit 110 may classify the electronic case report form according to the manager information stored as the electronic case report form related information and store the classified electronic case report form in the data storage unit 140.

The server management unit 110 may provide the electronic case report form to the user terminal 400 in response to a request of the user terminal 400. For example, the server management unit 110 may provide the electronic case report form to the user terminal 400 through any one among an application program, an application, and a website. When a plurality of users uses the platform 100, the server management unit 110 may provide each user terminal 400 with an electronic case report form corresponding to user information stored as the electronic case report form related information.

The server communication unit 120 may perform data communication with the manager terminal 300 and the user terminal 400 in a wired or wireless manner through the network 200. The server communication unit 120 may transmit and receive data between the platform 100, the manager terminal 300, and the user terminal 400 through a wired Internet communication method that supports Transmission Control Protocol/Internet Protocol (TCP/IP), or the like, or at least any one among various wireless communication methods such as Wideband Code Division Multiple Access (WCMDA), Long Term Evolution (LTE), Wireless Broadband Internet (WiBro), Wi-Fi (Wireless Fidelity), and the like.

When a request for generating a user acceptance test file (or UAT file) is received from the user terminal 400, the UAT file generation unit 130 may generate a user acceptance test file. The user terminal 400 may request generation of the user acceptance test file through any one among an application program, an application, and a website.

For example, the user terminal 400 may request generation of a user acceptance test file by clicking a user interface (UI) icon related to generation of a user acceptance test file on a page on which the electronic case report form provided by the server management unit 110 is displayed. However, it is not limited thereto, and the user terminal 400 may request generation of the user acceptance test file on at least any one page among the pages provided by the platform 100.

When generation of a user acceptance test file is requested from the user terminal 400, the UAT file generation unit 130 may record the point where the request is generated. For example, the UAT file generation unit 130 may record information on a page on which the request for generation of a user acceptance test file is generated from the user terminal 400. Here, the page information may include at least any one among a page address (Uniform Resource Locator, URL) and a page access path (Breadcrumb).

Accordingly, since the manager terminal 300 may confirm information on a page having a problem from the electronic case report form without confirming the entire user acceptance test file, it may be easy to confirm the user acceptance test file and move to a page that needs editing or correction.

The UAT file generation unit 130 may provide a UAT category list to the user terminal 400 and request to select any one from the UAT category list. Although the UAT file generation unit 130 may allow the user terminal 400 to select any one category from the UAT category list by providing the UAT category list as a drop-down User Interface (UI), it is not limited thereto. For example, the UAT file generation unit 130 may provide the UAT category list in the form of a check box that can be selected for each UAT category, and the user terminal 400 may select two or more UAT categories.

The UAT category list may be a category list related to reasons for requesting generation of a user acceptance test file. The UAT category list may be a list including at least any one among the functions provided in the user acceptance test system. For example, although the functions provided in the user acceptance test system may include Entry Screen, Trigger, Role, Privilege, Others, and the like, it is not limited thereto.

As another example, the UAT category list may be set in correspondence to each electronic case report form. In this case, the UAT category list is a list that is set in advance by any one among the manager terminal 300, the electronic case report form generation unit 160 shown in FIG. 3, and an electronic case report form generation system (not shown) in correspondence to each electronic case report form, and may be included in the electronic case report form related information.

As described above, the platform 100 according to an embodiment may classify the user acceptance test files according to the reason for requesting generation of a user acceptance test file by requesting the user terminal 400 to select a UAT category, and accordingly, the manager terminal 300 and the user terminal 400 may easily confirm the user acceptance test file for each UAT category, and confirm the reason for generating the user acceptance test file.

The UAT file generation unit 130 may provide a function capable of inputting the title of and opinions about the user acceptance test file. For example, although the UAT file generation unit 130 may provide a text box User Interface (UI) for inputting the title of and opinions about the user acceptance test file to the user terminal 400, it is not limited thereto. In addition, the UAT file generation unit 130 may provide a capture function for capturing part or all of the electronic case report form to the user terminal 400.

The capture function may be provided in response to a request of the user terminal 400. Although the user terminal 400 may capture part or all of the current page, it is not limited thereto, and the user terminal 400 may capture part or all of a page different from the page currently under the user acceptance test. In addition, the user terminal 400 may capture a plurality of pages.

In another embodiment, the UAT file generation unit 130 may automatically provide the capture function to the user terminal 400. For example, the UAT file generation unit 130 may record the point where the request is generated in response to the request for generation of a user acceptance test file of the user terminal 400, and then automatically provide the capture function to the user terminal 400. As another example, when the user terminal 400 selects a UAT category, the UAT file generation unit 130 may provide the capture function to the user terminal 400 as a next process.

The UAT file generation unit 130 may generate one UAT file including a record of the point where the user acceptance test request is generated by the user terminal 400, the UAT category selected by the user terminal 400, the title of and opinions about the user acceptance test file input from the user terminal 400, and a picture captured by the user terminal 400, and store the generated UAT file in the data storage unit 140.

In addition, the UAT file generation unit 130 may store the electronic case report form related information of the electronic case report form, which is the target of the user acceptance test, and the title, generation date and time, and the like of the UAT file in the data storage unit 140 as corresponding UAT file related information.

As described above, as the UAT file generated according to an embodiment includes the UAT category selected by the user terminal 400, the title of and opinions about the user acceptance test file input from the user terminal 400, and the picture captured by the user terminal 400, matched information may be provided to the manager terminal 300 and the user terminal 400.

Accordingly, it is possible to prevent generation of a communication error, such as the difference in the viewpoints of seeing the same object, between the user terminal 400 that generates contents of the UAT file and the manager terminal 300 that reads the UAT file and interprets the intention thereof.

The notification transmission unit 150 may transmit a notification to the manager terminal 300 and/or the user terminal 400. The notification transmission unit 150 may transmit a notification to the manager terminal 300 and/or the user terminal 400 through a notification pop-up, an email, a short message service (SMS), or the like.

The notification transmission unit 150 may provide a notification service. When the UAT file generation unit 130 generates a UAT file in response to a request of the user terminal 400, and stores the generated UAT file and UAT file related information in the data storage unit 140, the notification transmission unit 150 may inform that the UAT file has been generated to the manager terminal 300 corresponding to the manager information stored as corresponding UAT file related information. For example, the notification transmission unit 150 may transmit a notification pop-up to the manager terminal 300 through the server management unit 110 and/or the server communication unit 120, or transmit a message to an email or a phone number stored as manager information.

The server management unit 110 may generate and provide a UAT file list page to the manager terminal 300 and the user terminal 400. Here, the UAT file list page may be a page showing a list of user acceptance test files (hereinafter, UAT files) and information related to each of the UAT files.

When the UAT file is generated by the UAT file generation unit 130, the server management unit 110 may generate a UAT file list page according to the UAT file related information. For example, the UAT file list page may be generated based on any one among manager information and user information. As a specific example, the server management unit 110 may generate and provide a first UAT file list page to the manager terminal 300 on the basis of the manager information, and generate and provides a second UAT file list page to the user terminal 400 on the basis of the user information.

The manager terminal 300 and the user terminal 400 may rearrange the UAT file list according to the UAT file related information in the UAT file list page provided to each of the terminals.

The server management unit 110 may provide a UAT file, UAT file related information, and a communication function to the manager terminal 300 and the user terminal 400. For example, the server management unit 110 may provide a UAT file, UAT file related information, and a communication function on a detail page linked to any one among the UAT file list of the UAT file list page. Here, the detail page may be generated in correspondence to each UAT file.

Each detail page may include a function of showing the state of a corresponding UAT file. For example, the manager terminal 300 and the user terminal 400 may confirm state change of a UAT file, such as Submitted, Accepted, Applied, and Completed, on the detail page. For example, the Submitted state may mean a state in which a UAT file is generated by the UAT file generation unit 130 in response to a request of the user terminal 400, and the Accepted state may mean a state in which the manager terminal 300 confirms the UAT file and determines that the electronic case report form needs to be corrected or edited according thereto, and the Applied state may mean a state in which a corresponding electronic case report form has been corrected or edited according to the contents of the UAT file, and the Completed state may mean a state in which the user terminal 400 has confirmed the corrected or edited electronic case report form. However, it is not limited thereto, and state change of a UAT file may further include various states such as a Rejected state, a Removed state, and the like.

In addition, the UAT file related information, such as the title and the generation date and time of a corresponding UAT file, and the page address (URL) of the electronic case report form that is the target of the UAT file, and the UAT file may be confirmed on each detail page, and a communication function may be included on one side of the detail page. However, it is not limited thereto.

In addition, the communication function may be a comment function for the manager terminal 300 and the user terminal 400 to input an opinion about the UAT file provided on the detail page. For example, although the comment function may be provided as a text box User Interface (UI), it is not limited thereto.

The manager terminal 300 and the user terminal 400 may exchange opinions about the UAT file on any one detail page through the communication function. Accordingly, the manager terminal 300 and the user terminal 400 may manage history of editing and/or deleting the contents of the electronic case report form.

For example, the manager terminal 300 may access a detail page linked to the first UAT file on the first UAT file list page, and the user terminal 400 may access a detail page linked to the first UAT file on the second UAT file list page. Then, the manager terminal 300 and the user terminal 400 may confirm the first UAT file and the first UAT file related information, and smoothly communicate with each other by inputting an opinion about the first UAT file as a comment. In addition, the manager terminal 300 and the user terminal 400 may manage history of editing and/or deleting the contents of the electronic case report form, which is the generation target of the first UAT file.

Furthermore, when the state of the UAT file is changed or a comment on the UAT file is input, the notification transmission unit 150 may inform that the state of the UAT file is changed or a comment is registered to the manager terminal 300 corresponding to the manager information stored as corresponding UAT file related information and/or the user terminal 400 corresponding to the user information stored as corresponding UAT file related information.

As described above, as the user acceptance test system according to an embodiment provides a communication function that allows the manager and the user to see matched information in a user acceptance test process and perform bidirectional communication thereon, and provides a notification service to the manager terminal 300 and/or the user terminal 400, it may be advantageous in reducing unnecessary time and cost occurring at the user acceptance test step. The data storage unit 140 may store data exchanged with the manager terminal 300, the user terminal 400, and other platforms. The data storage unit 140 according to an embodiment may include a manager DB 141, a user DB 142, a case report form DB 143, and a UAT file DB 144.

The manager DB 141 may store manager information such as the manager's email, ID, password, phone number, affiliated group information, and the like, and information on access of the manager terminal 300 to the platform 100. In addition, the manager DB 141 may store electronic case report form related information corresponding to the electronic case report form stored or generated by the manager terminal 300, and UAT file related information.

The user DB 142 may store user information such as the user's email, ID, password, phone number, affiliated group information, and the like, and information on access of the user terminal 400 to the platform 100. In addition, the user DB 142 may store UAT file related information corresponding to the UAT file generated by the request of the user terminal 400.

The case report form DB 143 may store the electronic case report form and the electronic case report form related information received from the manager terminal 300, the electronic case report form generation system (not shown), and the electronic case report form generation unit 160 shown in FIG. 3.

When the electronic case report form and the electronic case report form related information are stored, the case report form DB 143 may classify and store them according to the electronic case report form related information. For example, the case report form DB 143 may classify and store them by generating a directory corresponding to any one among the clinical trial title, protocol number, manager information, and user information of the electronic case report form.

The UAT file DB 144 may store the UAT file and the UAT file related information generated by the UAT file generation unit 130. When the UAT file and the UAT file related information are stored, the UAT file DB 144 may classify and store them according to the UAT file related information. For example, the UAT file DB 144 may classify and store them by generating a directory corresponding to any one among the clinical trial title, protocol number, manager information, and user information of the electronic case report form that is the target of the UAT file.

As another example, the UAT file DB 144 may classify and store them by generating a directory corresponding to a UAT category selected by the user terminal 400.

FIG. 3 is a block diagram schematically showing the configuration of a platform according to another embodiment.

The platform 100 shown in FIG. 3 is different from the platform 100 shown in FIG. 2 in that it further includes at least any one among the electronic case report form generation unit 160 and the electronic case report form editing unit 170, and the rest of the configuration may be substantially the same. In FIG. 3, it will be described focusing on the difference from the embodiment of FIG. 2.

The platform 100' according to an embodiment may further include at least any one among the electronic case report form generation unit 160 and the electronic case report form editing unit 170.

The electronic case report form generation unit 160 may generate an electronic case report form in response to a request of the manager terminal 300 or the user terminal 400. The electronic case report form generation unit 160 may request information needed for generation of an electronic case report form and information related to the electronic case report form from the manager terminal 300 or the user terminal 400, and generate an electronic case report form according to a previously stored format of the electronic case report form. Here, although the previously stored format of the electronic case report form is a file stored in the data storage unit 140, and may be a file including, for example, a clinical trial item, a clinical trial result check box, and a data field related to a clinical trial result, it is not limited thereto.

The electronic case report form generation unit 160 may store the generated electronic case report form, together with the electronic case report form related information, in the case report form DB 143. In some embodiments, the electronic case report form related information may include a UAT category list set by the electronic case report form generation unit 160 in correspondence to the electronic case report form.

The electronic case report form editing unit 170 may provide an electronic case report form editing function to the manager terminal 300. The electronic case report form editing unit 170 may provide an electronic case report form from the case report form DB 143 to the manager terminal 300 in response to a request of the manager terminal 300. For example, the electronic case report form editing unit 170 may provide an electronic case report form to the manager terminal 300 through any one among an application program, an application, and a website. Although the electronic case report form editing unit 170 may request the electronic case report form related information from the manager terminal 300 to provide the electronic case report form, it is not limited thereto.

The manager terminal 300 may edit or correct the electronic case report form provided by the electronic case report form editing unit 170 on a page of any one among an application program, an application, and a website. For example, the manager terminal 300 may be provided with an electronic case report form editing function on the UAT file list page or a detail page that is linked to a UAT file list related to a correction target electronic case report form among the UAT file list.

When the manager terminal 300 completes the editing or correction, the electronic case report form editing unit 170 may store the corrected or edited electronic case report form in the case report form DB 143.

In addition, the electronic case report form editing unit 170 may store electronic case report form editing information in the case report form DB 143. Here, the electronic case report form edit information may include editing details, such as the date and time of correcting or editing the electronic case report form, edited pages, edited items, and the like.

When the electronic case report form editing unit 170 stores the corrected or edited electronic case report form in the case report form DB 143, the notification transmission unit 150 may inform the user terminal 400 corresponding to the user information stored as corresponding electronic case report form related information that the electronic case report form has been edited or corrected. For example, the notification transmission unit 150 may transmit a notification pop-up to the user terminal 400 through the server management unit 110 and/or the server communication unit 120, or transmit a message to an email or a phone number stored as user information.

As described above, since the platform 100 according to an embodiment provides the functions of generating electronic case report forms, providing user acceptance test service, and editing electronic case report forms, it may be advantageous for the manager terminal 300 to reduce the time and cost required for generating an electronic case report form that meets user's requirements and delivering the electronic case report form to the user. In addition, as the user terminal 400 confirms information on the process of generating and editing the electronic case report form at one platform 100 and participates in the process through the user acceptance test service, the user may save time and cost required for receiving an electronic case report form intended by the user.

Figure 4:
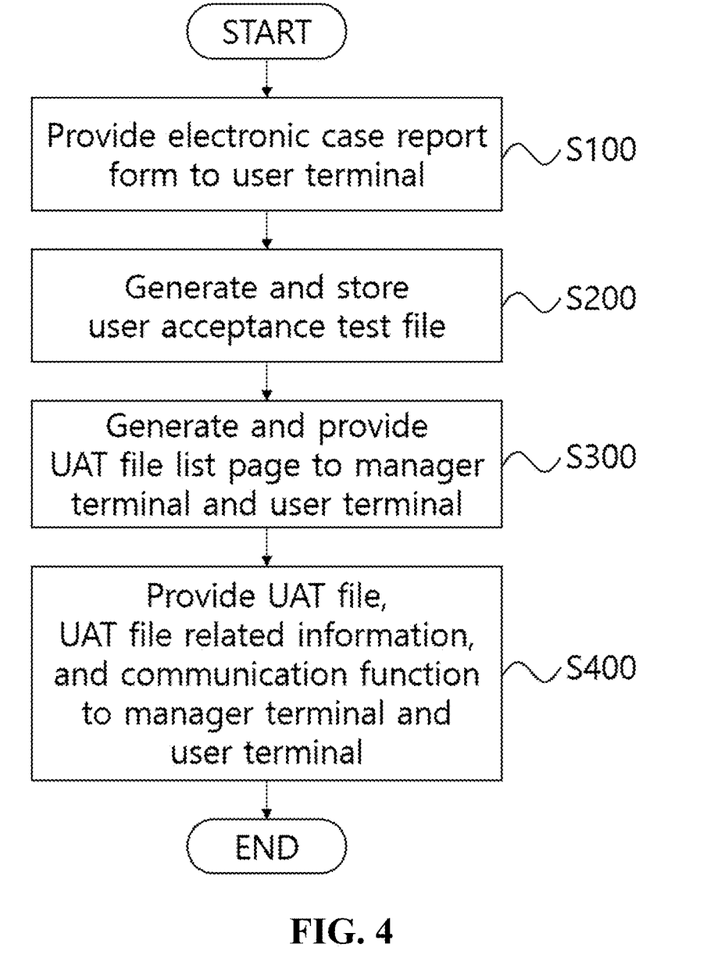
FIG. 4 is a flowchart illustrating a user acceptance test method of a user acceptance test system according to an embodiment.

FIG. 4 is a flowchart illustrating a user acceptance test method of a user acceptance test system according to an embodiment.

Referring to FIGS. 1 to 4, the server management unit 110 of the platform 100 may provide an electronic case report form to the user terminal 400 in response to a request of the user terminal 400 (S100).

The server management unit 110 may provide the electronic case report form to the user terminal 400 through any one among an application program, an application, and a website. The electronic case report form may be transferred from the manager terminal 300 or the electronic case report form generation system or may be generated by the electronic case report form generation unit 160 before the request of the user terminal 400 and stored in the case report form DB 143 together with the electronic case report form related information including the user information. Accordingly, the server management unit 110 may provide the electronic case report form corresponding to the user information of the user terminal 400 to the user terminal 400.

Subsequently, the UAT file generation unit 130 may generate a user acceptance test file in response to a request of the user terminal 400, and store the generated user acceptance test file in the UAT file DB 144 (S200).

The user terminal 400 may request generation of a user acceptance test file through any one among an application program, an application, and a website. For example, the user terminal 400 may request generation of a user acceptance test file by clicking a user interface (UI) icon related to generation of a user acceptance test file on a page on which an electronic case report form provided by the server management unit 110 is displayed. However, it is not limited thereto, and the user terminal 400 may request generation of the user acceptance test file on at least any one page among the pages provided by the platform 100.

A process of generating the user acceptance test file by the UAT file generation unit 130 will be described in detail with reference to FIG. 5.

The UAT file generation unit 130 may generate a user acceptance test file based on the information collected in the process of generating the user acceptance test file and information input or selected by the user terminal 400, and store the generated user acceptance test file in the UAT file DB 144. In addition, the UAT file generation unit 130 may store the electronic case report form related information of the electronic case report form, which is the target of the user acceptance test, and the title, generation date and time, and the like of the UAT file in the UAT file DB 144 as corresponding UAT file related information.

In some embodiments, when the UAT file generation unit 130 generates a UAT file in response to a request of the user terminal 400, and stores the generated UAT file and UAT file related information in the data storage unit 140, the notification transmission unit 150 may inform that the UAT file has been generated to the manager terminal 300 corresponding to the manager information stored as corresponding UAT file related information. For example, the notification transmission unit 150 may transmit a notification pop-up to the manager terminal 300 through the server management unit 110 and/or the server communication unit 120, or transmit a message to an email or a phone number stored as manager information.

Next, the server management unit 110 may generate and provide a UAT file list page to the manager terminal 300 and the user terminal 400 (S300).

When the UAT file is generated by the UAT file generation unit 130, the server management unit 110 may generate a UAT file list page according to the UAT file related information. The UAT file list page may be generated based on at least one among manager information and user information.

For example, the server management unit 110 may generate and provide a first UAT file list page to the manager terminal 300 on the basis of the manager information, and generate and provides a second UAT file list page to the user terminal 400 on the basis of the user information.

Then, the server management unit 110 may provide a UAT file, UAT file related information, and a communication function to the manager terminal 300 and the user terminal 400 (S400).

As a specific example, the server management unit 110 may provide a UAT file, UAT file related information, and a communication function on a detail page linked to any one among the UAT file list of the UAT file list page. Here, the detail page may be generated in correspondence to each UAT file.

Each detail page may include a function of showing the state of a corresponding UAT file. For example, the manager terminal 300 and the user terminal 400 may confirm state change of a UAT file, such as Submitted, Accepted, Applied, and Completed, on the detail page. For example, the Submitted state may mean a state in which a UAT file is generated by the UAT file generation unit 130 in response to a request of the user terminal 400, and the Accepted state may mean a state in which the manager terminal 300 confirms the UAT file and determines that the electronic case report form needs to be corrected or edited according thereto, and the Applied state may mean a state in which a corresponding electronic case report form has been corrected or edited according to the contents of the UAT file, and the Completed state may mean a state in which the user terminal 400 has confirmed the corrected or edited electronic case report form. However, it is not limited thereto, and state change of a UAT file may further include various states such as a Rejected state, a Removed state, and the like.

In addition, the UAT file related information, such as the title and the generation date and time of a corresponding UAT file, and the page address (URL) of the electronic case report form that is the target of the UAT file, and the UAT file may be confirmed on each detail page, and a communication function may be included on one side of the detail page. However, it is not limited thereto.

In addition, the communication function may be a comment function for the manager terminal 300 and the user terminal 400 to input an opinion about the UAT file provided on the detail page. For example, although the comment function may be provided as a text box User Interface (UI), it is not limited thereto.

The manager terminal 300 and the user terminal 400 may exchange opinions about the UAT file on any one detail page through the communication function. Accordingly, the manager terminal 300 and the user terminal 400 may manage history of editing and/or deleting the contents of the electronic case report form.

For example, the manager terminal 300 may access a detail page linked to the first UAT file on the first UAT file list page, and the user terminal 400 may access a detail page linked to the first UAT file on the second UAT file list page. Then, the manager terminal 300 and the user terminal 400 may confirm the first UAT file and the first UAT file related information, and smoothly communicate with each other by inputting an opinion about the first UAT file as a comment. In addition, the manager terminal 300 and the user terminal 400 may manage history of editing and/or deleting the contents of the electronic case report form, which is the generation target of the first UAT file.

Furthermore, when the state of the UAT file is changed or a comment on the UAT file is input, the notification transmission unit 150 may inform that the state of the UAT file is changed or a comment is registered to the manager terminal 300 corresponding to the manager information stored as corresponding UAT file related information and/or the user terminal 400 corresponding to the user information stored as corresponding UAT file related information.

As described above, as the manager and the user see matched information such as a UAT file and UAT file related information in the system and perform bidirectional communication thereon, the user acceptance test method of the user acceptance test system according to an embodiment may be advantageous in reducing unnecessary time and cost occurring at the user acceptance test step.

Figure 5:
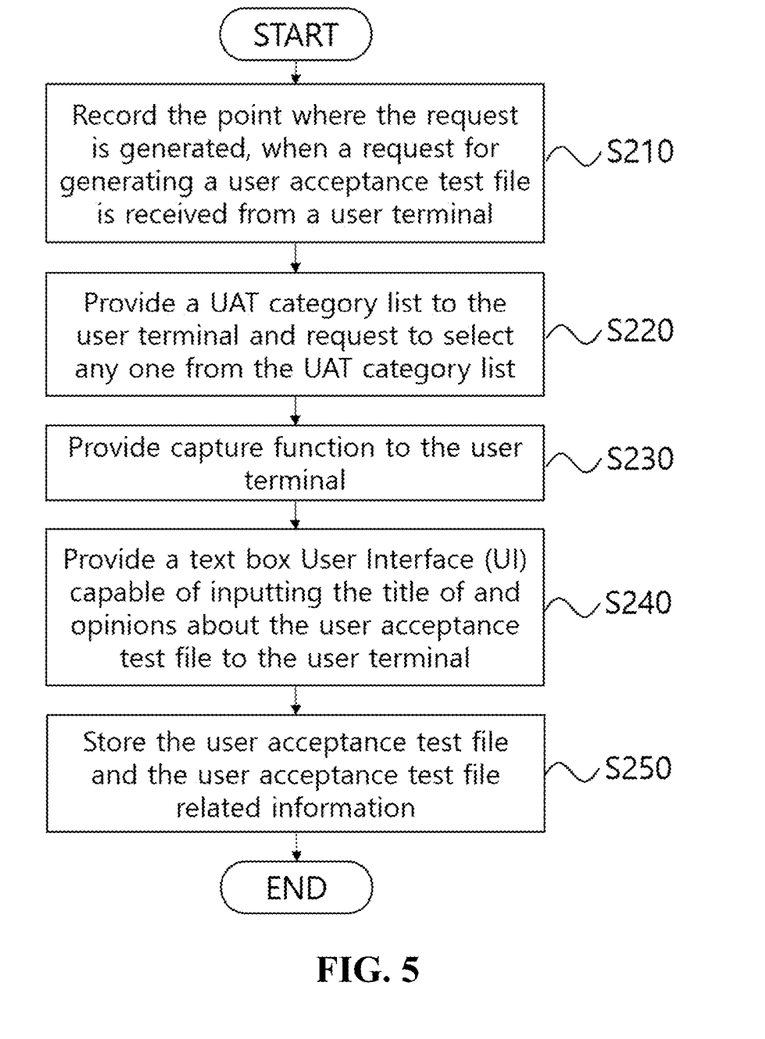
FIG. 5 is a flowchart illustrating a method of generating a user acceptance test file according to an embodiment.

FIG. 5 is a flowchart illustrating a method of generating a user acceptance test file according to an embodiment.

Referring to FIG. 5, when a request for generating a user acceptance test file is received from the user terminal 400, the UAT file generation unit 130 may record the point where the request is generated (S210).

The user terminal 400 may request generation of a user acceptance test file through any one among an application program, an application, and a website. For example, the user terminal 400 may request generation of a user acceptance test file by clicking a user interface (UI) icon related to generation of a user acceptance test file on a page on which an electronic case report form provided by the server management unit 110 is displayed. However, it is not limited thereto, and the user terminal 400 may request generation of the user acceptance test file on at least any one page among the pages provided by the platform 100.

When generation of a user acceptance test file is requested from the user terminal 400, the UAT file generation unit 130 may record the point where the request is generated. For example, the UAT file generation unit 130 may record information on a page on which the request for generation of a user acceptance test file is generated from the user terminal 400. Here, the page information may include at least any one among a page address (Uniform Resource Locator, URL) and a page access path (Breadcrumb).

Thereafter, the UAT file generation unit 130 may provide a UAT category list to the user terminal 400 and request to select any one from the UAT category list (S220).

The UAT category list may be a category list related to reasons for requesting generation of a user acceptance test file. The UAT category list may be a list including at least any one among the functions provided in the user acceptance test system. For example, although the functions provided in the user acceptance test system may include Entry Screen, Trigger, Role, Privilege, Other, and the like, it is not limited thereto.

As another example, the UAT category list may be set in correspondence to each electronic case report form. In this case, the UAT category list is a list that is set in advance by any one among the manager terminal 300, the electronic case report form generation unit 160 shown in FIG. 3, and an electronic case report form generation system in correspondence to each electronic case report form, and may be included in the electronic case report form related information.

Next, the UAT file generation unit 130 may provide a capture function for capturing part or all of the electronic case report form to the user terminal 400 (S230).

The UAT file generation unit 130 may provide the capture function in response to a request of the user terminal 400. Although the user terminal 400 may capture part or all of the current page, it is not limited thereto, and the user terminal 400 may capture part or all of a page different from the page currently under the user acceptance test. In addition, the user terminal 400 may capture a plurality of pages.

In some embodiments, the UAT file generation unit 130 may automatically provide the capture function to the user terminal 400. For example, when the user terminal 400 selects a UAT category, the UAT file generation unit 130 may provide the capture function to the user terminal 400 as a next process. As another example, the UAT file generation unit 130 may record the point where the request is generated in response to the request for generation of a user acceptance test file of the user terminal 400, and then automatically provide the capture function to the user terminal 400.

Then, the UAT file generation unit 130 may provide a text box User Interface (UI) capable of inputting the title of and opinions about the user acceptance test file to the user terminal 400 (S240).

Finally, the UAT file generation unit 130 may store the user acceptance test file and the user acceptance test file related information in the UAT file DB 144 (S250).

The UAT file generation unit 130 may generate one UAT file including a record of the point where the user acceptance test request is generated by the user terminal 400, the UAT category selected by the user terminal 400, the title of and opinions about the user acceptance test file input from the user terminal 400, and a picture captured by the user terminal 400, and store the generated UAT file in the UAT file DB 144.

In addition, when the UAT file is stored in the data storage unit 140, the UAT file generation unit 130 may store the electronic case report form related information of the electronic case report form, which is the target of the user acceptance test, and the title, generation date and time, and the like of the UAT file in the data storage unit 140 as corresponding UAT file related information.

As described above, as the user acceptance test file generated according to the user acceptance test file generation method according to an embodiment includes the UAT category selected by the user terminal 400, the title of and opinions about the user acceptance test file input from the user terminal 400, and the picture captured by the user terminal 400, matched information may be provided to the manager terminal 300 and the user terminal 400.

Accordingly, it is possible to prevent generation of a communication error, such as the difference in the viewpoints of seeing the same object, between the user terminal 400 that generates contents of the UAT file and the manager terminal 300 that reads the UAT file and interprets the intention thereof.

Until now, the present invention has been described in detail focusing on the embodiments shown in the drawings. These embodiments are intended to illustrate, rather than limit, the present invention, and should be considered in an illustrative viewpoint, rather than a restrictive viewpoint. The true technical protection scope of the present invention should be determined by the technical spirit of the appended claims rather than the above description. Although specific terms are used in this specification, they are used only for the purpose of describing the concept of the present invention, and are not used to limit the meaning or the scope of the present invention described in the claims. Each step of the present invention does not necessarily have to be performed in the described order, and may be performed in parallel, selectively, or individually. Those skilled in the art will understand that various modifications and equivalent other embodiments are possible without departing from the essential technical spirit of the present invention as claimed in the claims. It is to be understood that equivalents include both presently known equivalents, as well as equivalents that will be developed in the future, i.e., all components invented to perform the same function, regardless of the structure.

According to the user acceptance test system according to the embodiments, since a manager and a user may see matched information, it may be advantageous in reducing unnecessary time and cost occurring at the user acceptance test step.

The effects according to the embodiments of the present invention are not limited by the contents exemplified above, and more various effects are included in this specification.

DESCRIPTION OF SYMBOLS

10: User acceptance system
100: Platform
110: Server management unit
120: Server communication unit
130: UAT file generation unit
140: Data storage unit
150: Notification transmission unit
160: Electronic case report form generation unit
170: Electronic case report form editing unit
141: Manager DB
142: User DB
143: Case report form DB
144: UAT file DB

What is claimed is:

1. A user acceptance test (UAT) method for setting an electronic case report form (eCRF) used to conduct clinical trials, wherein a UAT file is a file for editing or correcting the eCRF, the UAT method comprising:
   generating a UAT file on a page on which the eCRF is provided in response to a request of a user terminal, wherein the generating the UAT file includes:
   recording page information on which a UAT file generation request is generated from the user terminal;
   providing a UAT category list related to a reason for requesting generation of the UAT file to the user terminal, and requesting to select any one from the UAT category list;
   automatically providing the user terminal with a capture function for capturing at least a part of the eCRF, wherein the capture function is automatically provided to the user terminal after recording the page information on which the UAT file generation request is generated by the user terminal or after selecting any one from the UAT category list by the user terminal;
   providing the user terminal a text box user interface (UI) capable of inputting a title of and opinions about of the UAT file; and
   generating a single UAT file including the record of the page information on which the UAT request is generated by the user terminal, the UAT category list selected by the user terminal, the title of and opinions about the UAT file input from the user terminal, and a picture captured by the user terminal;
   storing the UAT file and UAT file related information by generating a directory corresponding to a UAT category selected by the user terminal or any one among clinical trial title, protocol number, manager information, and user information of the electronic case report form that is a target of the UAT file;
   generating a UAT file list page showing a list of a plurality of UAT files and the information related to the plurality of UAT files, and providing the UAT file list page to the user terminal and a manager terminal; and
   providing the manager terminal and the user terminal with the UAT file, the UAT file related information, and a communication function on a detail page linked to any one among the plurality of UAT files on the UAT file list page; and
   transmitting notification to at least one of the manager terminal and the user terminal that the UAT file has been generated, a state of the UAT file is changed, or a comment is registered,
   wherein the page information includes a page address (URL),
   wherein the UAT file related information includes the page address (URL) of the eCRF that is the target of the UAT file,
   wherein the detail page shows the state of the UAT file, and
   wherein the state includes a Submitted State in which the UAT file is generated, an Accepted State in which the manager terminal has confirmed the need for correction or editing of the eCRF, an Applied State in which the eCRF has been corrected or edited according to contents of the UAT file, and a Completed State in which the user terminal has confirmed the corrected or edited eCRF.

2. The method according to claim 1, wherein the UAT file related information includes at least one among a clinical trial title, manager information, user information, a title of the UAT file, and a date and time of generating the UAT file, which are related to the electronic case report form that is the target of a user acceptance test.

3. The method according to claim 2, wherein the UAT file list page includes the list of the plurality of UAT files and the information related to the plurality of UAT files and is generated based on the UAT file related information for at least one among the plurality of UAT files.

4. The method according to claim 1, wherein the communication function has a comment function including the text box UI that can be input by the manager terminal and the user terminal on the detail page.

5. The method of claim 1, further comprising:
   generating and storing the eCRF in response to a request of the manager terminal or the user terminal;

providing an eCRF editing function to the manager terminal;
storing an edited version of the eCRF and an edit information of the eCRF after the manager terminal completes editing the eCRF; and
transmitting notification to the user terminal to inform that the eCRF is edited or corrected.

6. A user acceptance test (UAT) system for setting an electronic case report form (eCRF) used to conduct clinical trials, wherein a UAT file is a file for editing or correcting the eCRF, the system comprising:
a UAT file generation unit configured to generate a UAT file on a page which the eCRF is provided in response to a request of a user terminal, wherein the UAT file generation unit is further configured to:
record page information on which a UAT file generation request is generated from the user terminal;
provide a UAT category list related to a reason for requesting generation of the UAT file to the user terminal, and request to select any one from the UAT category list;
automatically provide the user terminal with a capture function for capturing at least a part of the eCRF, wherein the capture function is automatically provided to the user terminal after recording the page information on which the UAT file generation request is generated by the user terminal or after selecting any one from the UAT category list by the user terminal;
providing the user terminal a text box user interface (UI) capable of inputting a title of and opinions about of the UAT file; and
generating a single UAT file including the record of the page information on which the UAT request is generated by the user terminal, the UAT category list selected by the user terminal, the title of and opinions about the UAT file input from the user terminal, and a picture captured by the user terminal;
a data storage unit configured to store the UAT file and UAT file related information by generating a directory corresponding to a UAT category selected by the user terminal or any one among clinical trial title, protocol number, manager information, and user information of the electronic case report form that is a target of the UAT file;
a server management unit configured to generate a UAT file list page showing a list of a plurality of UAT files and the information related to the plurality of UAT files, and provide a manager terminal and the user terminal with the UAT file list page and a detail page that is linked to any one among the plurality of UAT files of the UAT file list page and includes the UAT file, the UAT file related information, and a communication function; and
a notification transmission unit configured to transmit notification to at least one of the manager terminal and the user terminal that the UAT file has been generated, a state of the UAT file is changed, or a comment is registered,
wherein the page information includes a page address (URL),
wherein the UAT file related information includes the page address (URL) of the eCRF that is the target of the UAT file,
wherein the detail page shows the state of the UAT file, and
wherein the state includes a Submitted State in which the UAT file is generated, an Accepted State in which the manager terminal has confirmed the need for correction or editing of the eCRF, an Applied State in which the eCRF has been corrected or edited according to contents of the UAT file, and a Completed State in which the user terminal has confirmed the corrected or edited eCRF.

7. The system according to claim 6, wherein the communication function has a comment function including a text box UI that can be input by the manager terminal and/or the user terminal on the detail page.

8. The system according to claim 6, further wherein the notification transmission unit transmits the notification to the manager terminal and the user terminal through at least any one among a notification pop-up, an email, and a short message service (SMS).

9. The system of claim 6, further comprising:
an electronic case report form generation unit configured to generate the eCRF in response to a request of the manager terminal or the user terminal and store the generated eCRF in the data storage unit; and
an electronic case report form editing unit configured to provide an eCRF editing function to the manager terminal,
wherein, after the manager terminal completes editing the eCRF, the electronic case report form editing unit stores the edited version of the eCRF and an edit information of the eCRF in the data storage unit, and the notification transmission unit transmits notification to the user terminal to inform that the eCRF is edited or corrected.

* * * * *